United States Patent Office 3,434,861
Patented Mar. 25, 1969

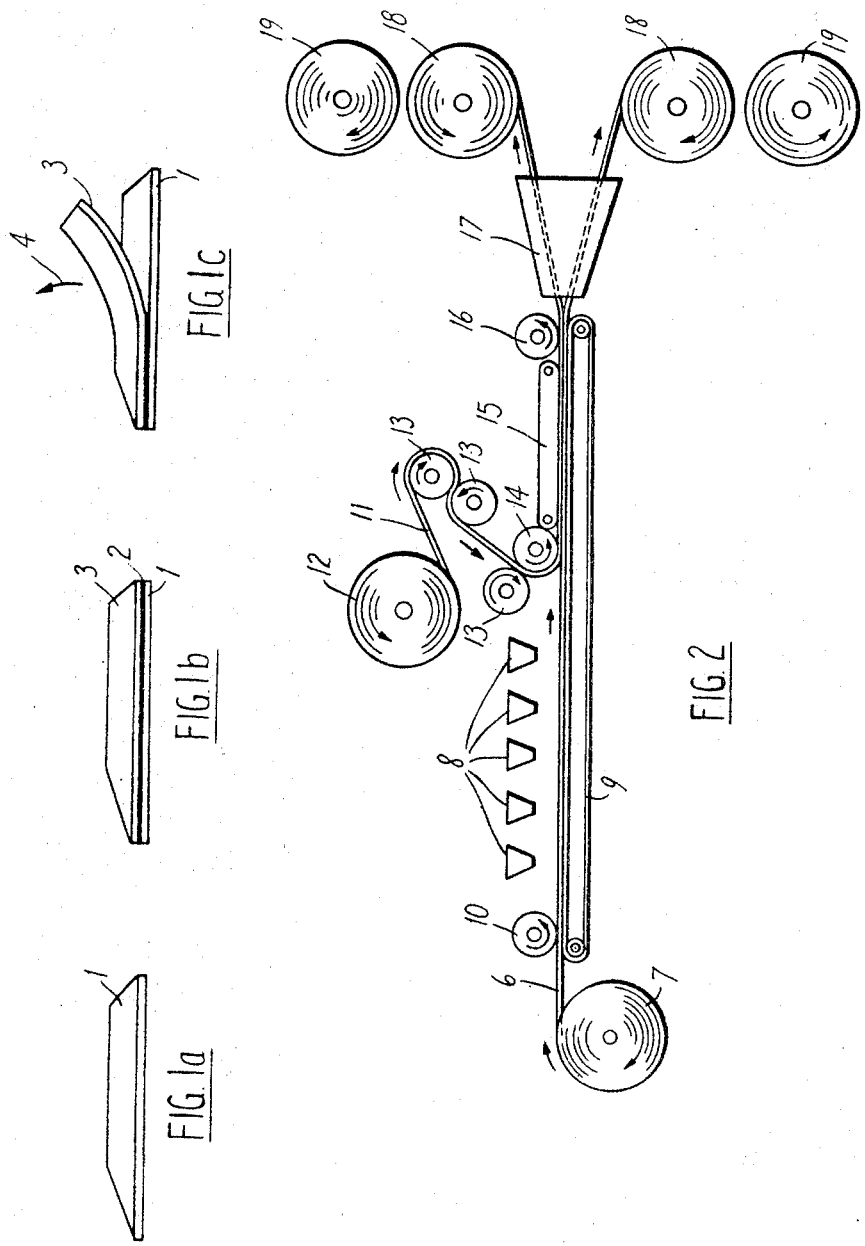

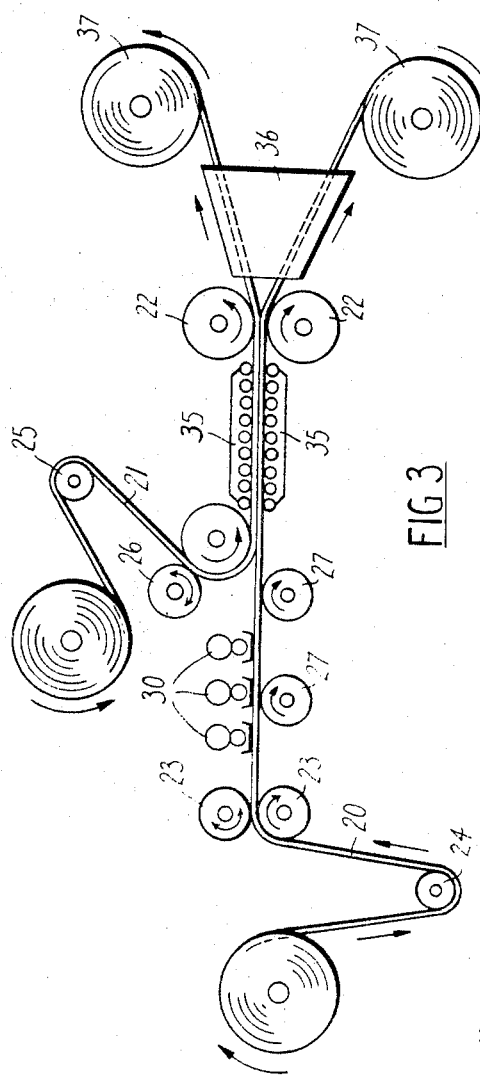
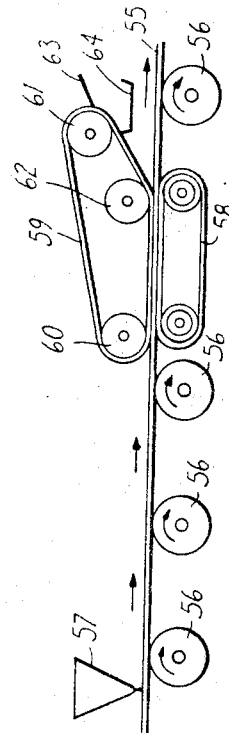
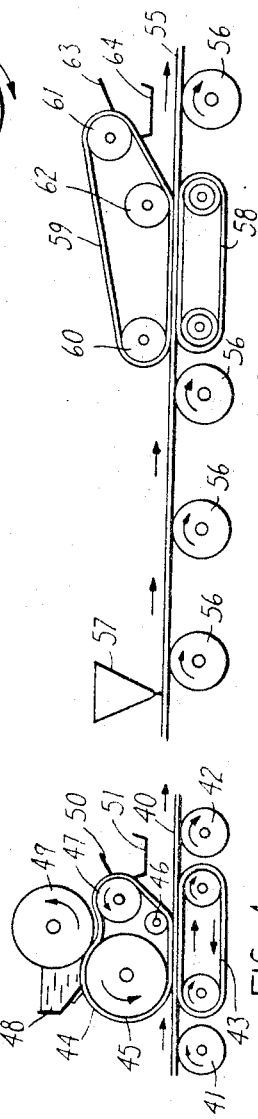

3,434,861
PROCESS FOR FORMING DECORATIVE PATTERNS
Jane Luc, 17 Boulevard Clemenceau, Strasbourg, Bas-Rhin, France
Continuation-in-part of abandoned application Ser. No. 343,069, Feb. 6, 1964. This application Feb. 11, 1966, Ser. No. 526,708
Claims priority, application France, June 16, 1960, 830,231
Int. Cl. B44c 1/20; B44d 5/00
U.S. Cl. 117—10
13 Claims

ABSTRACT OF THE DISCLOSURE

The method for forming a decorative pattern on a surface by bringing together a pair of members having at least one layer of a viscous material between the opposed surfaces thereof, wherein at least one of the members is a flexible sheet, the viscous material is substantially non-leveling in its unset condition and capable of subsequent setting and substantially non-penetrating into the members, and comprises a polymer of ethylenically unsaturated compounds in a liquid phase, which material is inert with respect to the members, then applying pressure to the members, and then separating the members before the viscous material begins to set, the separation of the members causing the viscous material to be partitioned between the members and to be drawn into a pattern which is reproduced on the surfaces of each of the members as the members are separated.

---

This application is a continuation-in-part of my copending application Ser. No. 343,069, filed Feb. 6, 1964, which in turn is a continuation-in-part of my application Serial No. 115,791, filed June 8, 1961, now abandoned.

This invention relates to the art of forming decorative patterns and more particularly to methods of forming decorative patterns on various types of surfaces and within the thickness of free unsupported films.

An object of this invention is to provide a process for producing a variety of patterns on surfaces of different types.

Yet another object of this invention is to produce patterns within the depth of free films or coatings simultaneously with their formation.

A further object is to provide a process for imparting surface texture to free films and coatings simultaneously with their formation and decoration.

Another object is a process for producing decorative patterns in a viscous material capable of subsequent setting while the viscous material is in the viscous and unset condition.

A still further object is to provide a process for producing decorative patterns in a settable viscous material cheaply and conveniently without the need for printing rollers and associated equipment.

These and other objects will be apparent from the specification which follows:

This invention makes it possible to obtain a wide variety of decorative patterns in both color and/or relief on various surfaces such as woven or unwoven fabrics, paper, paperboard, wood, cork, plastic film and sheet, expanded plastics, metal foil and sheets, asbestos, and plasterboard. These materials may be in flexible or rigid form.

Many decorative effects can be obtained according to this invention which cannot be obtained by conventional printing techniques. At the same time, the elimination of conventional printing rollers and associated equipment results in a substantial cost saving.

According to this invention a decorative pattern is formed in a viscous material capable of subsequent setting by bringing together a pair of members, at least one of which is a flexible sheet, with a layer of settable viscous material therebetween, applying the pressure to the members, and separating the members while the viscous material is still unset so that the viscous material flows into a pattern which is partitioned between the opposed surfaces of the two members resulting in the formation of identical decorative patterns in the portions of the viscous material associated with each surface. The viscous material according to this invention comprises an addition polymer in a liquid phase, to which color may be imparted by the addition of pigments, fillers and dyestuffs. Either in addition to, or in lieu of pigment, one may incorporate particles of mica, metal and the like.

The viscous materials in the present invention may consist of emulsions, dispersions, or suspensions of an addition polymer in either aqueous or organic liquid media. Addition polymers, i.e. homopolymers and copolymers of ethylenically unsaturated compounds, constitute polymeric ingredients of the viscous materials of this invention. The viscous material comprises discrete solid polymer particles in a continuous liquid medium. Dispersions and emulsions of polymers are particularly suitable in that they possess many of the properties required in the practice of this invention. For example these materials in their viscous or unset condition possess the ability, or can be formulated so as to hold the pattern until it is set. They also remain on the top of the permeable surface of a material, and do not penetrate further into its bulk than iis necessary to obtain adhesion. This leaves a sufficient quantity of the viscous material on the surface in which the pattern can be formed.

The viscous materials used according to the present invention are materials which are viscous at the time the pattern is formed but capable of subsequent setting.

Polymers used in this invention include polyvinyl chloride, polyvinylidene chloride and copolymers thereof, polyvinyl acetate, vinyl chloride-vinyl acetate copolymer, polyvinyl butyral and polystyrene, which may be used in the form of suspension, emulsions or dispersions.

Types of vinyl dispersion particularly suitable to the practice of this invention are vinyl dispersions such as plastisols, plastigels, organosols, and organogels, which are dispersions of vinyl chloride and copolymers in plasticizers, dispersants and diluents, with the addition of stabilizers, colors, fillers, and/or gelling agents, depending upon the properties needed for a specific application. These materials are particularly suitable for coating woven and unwoven fabrics, metals, and papers, and to form a decorative integral skin on an expanded vinyl sheet. These vinyl dispersions can be formulated to suit the required final result. For example, when decorating a paper surface, an organosol can be used which remains on the surface and does not strike through the paper. When decorating felt, a high viscosity plastisol can be chosen to avoid its penetration into the bulk of the fabric, leaving sufficient thickness of the viscous material in which the designs can form. Such materials will produce a thick, flexible, insulating, wear-resistant decorative coating on fusing, and in consequence such dispersions are particularly suitable to aplication of this invention.

Acrylic and modified acrylic polymers may also be used. Aqueous suspensions or emulsions of the polymer are particularly suitable. Among the suitable acrylic polymers are polyethyl acrylate, polymethyl acrylate, copolymers of ethyl acrylate and/or methyl methacrylate with other ethylenically unsaturated compounds, such as styrene. Polymer emulsions of the higher alkyl methacrylates may also be used. Emulsions of this type are well known in the art, and generally contain approximately 50% water and 50% organic phase.

Acrylic polymer emulsions or latexes can be applied to many flexible surfaces such as paper, fabrics, and metal foil, where their inherent flexibility prevents cracking, creasing and weathering. Vinyl, acrylic, and other latexes also possess the property of remaining on the top of an absorbent surface while having good adhesion to it. They are also resistant to water and solvents, fireproof and heat sealable. In a viscous or unset condition they are also substantially nonleveling or "short" so that the pattern is held in shape until it is set. This is in contrast to many paints such as wall paints which are leveling or "long" so that brush marks will be eliminated before the paint dries. At the same time these polymeric emulsions have excellent transparency and flow properties and permit particles, such as pigment, to move freely and rapidly through them to form the pattern. In the areas of the pattern which are substantially void of pigment, these emulsion paints also dry to form a clear transparent flexible film, which is an essential asset to the invention and one that gives additional lustre to the decorative effects obtained on transparent films or sheets.

These and the aforementioned advantages are not usually combined, for example, in many types of paint where pigments will not be able to concentrate so rapidly in certain areas of the pattern to permit sufficient pattern contrast. Also, the vehicles in paints will often dry into an opaque or yellowish film in the areas almost devoid of pigment, making them unsuitable for applications to many materials including transparent materials.

The decorative patterns of this invention can be formed on a variety of surfaces, both rigid and flexible. They can also be formed as free films. The patterns of this invention can be formed on the opposed surfaces of a pair of flexible members such as flexible sheets. They can also be formed on the opposed surfaces of a pair of members, one of which is rigid and the other flexible. However, it is necessary that at least one of the two members be flexible in order to make it possible to control the speed of separation of the two members and thereby determine the nature of the pattern.

Rigid metal and plastic surfaces, such as sheets, plates and other articles can also be given a decorative coating according to this invention. Generally the patterns of this invention are formed on flat surfaces, although shaped metal and plastic articles may also be used as the members on which the patterns are formed.

Decoration of the surfaces of flexible materials such as woven and unwoven textiles of natural and synthetic fibers, for example cotton fabric, felt, glass cloth, nylon, and materials such as paper and metal foils, is a particularly useful aspect of this invention. Different types of viscous material permit the decoration of these materials either directly or by transfer. If a rontinuous decorative coating is desired for an open weave material, a vinyl dispersion of higher viscosity is chosen than that which is required for a closer weave material to avoid penetration of the viscous material below the surface. In certain cases it is preferable to give one side of a permeable substrate an appropriate primer or preliminary coating. For example, when a felt is to be given a decoraitve plastisol coat, it is preferable to give the felt a preliminary fused coating. This avoids any penetration of the more expensive pigmented plastisol (if it is in itself insufficiently viscous to remain on the surface) and it also provides a smooth surface on which to form the patterns. While smooth surfaces are generally preferable to rough ones, rough surfaces can either be given a thicker coat or decorated by transfer.

Whereas permeable materials are generally decorated by transfer unless they are to receive a continuous coating, it is possible to decorate a permeable material by sandwiching it between two members impermeable to the viscous material, the pattern created by their contact and separation imparting the pattern of the viscous material to the permeable material. A single web may also be decorated in this manner, and it can for example be sandwiched between two impermeable webs coated in contrasting colors.

During applications of the process means must be provided to apply pressure to the opposed surfaces while they are in contact with the viscous material sandwiched between them, and rollers are generally provided when the process herein described is carried out on a continuous basis.

A the first step of the present invention, a viscous material is applied in its unset condition to the surface of at least one member on which the pattern is to be formed. Depending upon the nature of the viscous material and the material to be decorated, the viscous material is applied by one of the usual techniques, as for example by spreading, spraying, extrusion, calendering, doctoring, or by a brush or roller.

The viscosity of the material is chosen in accordance with the nature of the pattern desired, and the end use requirements. The patterns produced according to this invention generally have the appearance of a multiplicity of veins on the surfaces of each of the two members on which the pattern is formed. Fine veins are generally obtained by using comparatively thin layers of materials of high viscosity, while wider spaced veins are obtained with thicker layers of lower viscosity materials.

At least one layer of viscous material is applied or formed between two opposed surfaces prior to bringing them together. The layer of viscous material may be of one color or may be multicolored, for example by inclusion of several pigments in the viscous material without complete mixing, or by local deposition either at random or in selected areas of the surface, of viscous materials of different tints or colors, which, when pressure is applied to the opposing surfaces tend to merge together, giving unique decorative effects. It is possible, however, to apply two layers if desired, for example by applying one layer of viscous material to one surface and another layer to the other surface. By using viscous materials having two different colors of sufficient tone contrast a large variety of decorative effects can be obtained which are not obtainable with a single color layer.

The two viscous materials may be of the same viscosity. On the other hand, materials of different viscosities may be used, in which case the more fluid material is prone to flow more readily than the more viscous material. The use of viscous materials of different viscosities gives decorative effects which are not obtainable by using two materials of the same viscosity.

Three or more layers of viscous material may be applied between the two surfaces for unusual decorative effects. This requires the application of at least two layers of viscous material to a single surface. This can be done most advantageously by applying the viscous material of higher viscosity directly to the surface, and then applying another viscous material of contrasting color and lower viscosity on top of the higher viscosity material.

After one or more layers of viscous material have been formed on the surface of at least one of the two members, the two members are brought together and pressure is applied to urge the opposed surfaces thereof together and thereby squeeze the viscous material which is sandwiched therebetween. This may cause some of the viscous material to flow, heightening the decorative effect.

Formation of the patterns according to this invention is accomplished by separating the two opposed surfaces after they have been brought together under pressure but before the viscous material begins to set. The two members are separated progressively, starting at one edge of the opposed surfaces. Thus, in the case of a flexible member and a rigid member, one end of the flexible member is lifted from the rigid member and the flexible member is progressively peeled off. In the case of two flexible sheets, the two sheets may be pulled apart progressively from one end toward the other end thereof. Continuously moving flexible webs are separated according to known techniques for separating flexible webs after traveling together. The action of separating the two surfaces creates stresses within the viscous material and causes it to flow into a pattern behind the line of separation of the two surfaces. The actual separation of the two surfaces causes the viscous material to be partitioned between them, and generally results in the formation of identical patterns upon each surface. Where distinct color layers of viscous material are used, however, the patterns produced on opposing surfaces may be in complementary colors.

The speed of progressive separation can be easily controlled. It has been found that the nature of the pattern is profoundly influenced by the speed at which the two surfaces are separated. In general faster speeds of separation result in finer veins, and lower speeds of separation result in coarser wider spaced veins. Thus by changing the speed of separation one obtains a considerable degree of control over the appearance of the pattern produced. In fact on a given type of surface the pattern and its characteristics such as size, type, direction and manner of branching of the veins can be controlled so well by controlling the speed of separation, the viscosity and nature of the viscous material, and the pressure applied to the surfaces, that virtually identical repetitive patterns can be obtained without the usual printing equipment which assures identity of pattern in conventional printing processes.

After separation of the two opposed surfaces with resultant partition of the viscous material, the material is set or fused. A coating or free film with a permanent pattern is produced on setting. It is important that the viscous material retain the pattern once it is formed and be substantially non-leveling, particularly where clear definition is required, so that it will hold its shape between the time the surfaces have been separated and the time the viscous material is set. Setting may be allowed to take place by air drying, by chilling or may be advantageously operated by thermal methods, such as oven drying, fusing and curing at the normal temperatures required for a given type of viscous material, which can reach 250° C. or more.

The pigment which initially is evenly distributed throughout the viscous material tends to concentrate in the veins which are formed on separation of the two opposed surfaces, so that the concentration of pigment tends to become greatest where the thickness of viscous material is also greatest. The varying color intensities heighten the decorative effects obtained. Where colored patterns are produced, the amount and type of color used, and the homogenity or degree of mixing and of dispersion of the color in the viscous medium, all contribute to the effects obtained.

Where partition in a continuous layer of viscous material such as a thick film of relatively high viscosity material, produces effects of surface relief, and it is required to obtain patterns with less pronounced relief, or to give a specific finish to the decorative coating or free film, this operation may be combined with the production of the decorative film, coating or product. Thus it is possible to give the products a leather or wood grain, a patterned emboss, a highly polished or other surface texture or finish. In this way a release surface such as a release paper or other non-adherent sheet or foil material (including metal foil treated with a release agent), having the required surface finish is unrolled with light pressure onto the newly formed patterned viscous material before it is set, and left in place until after setting, chilling or fusing when it is easily stripped from the surface of the solidified coating and can be used again. It is also possible to obtain variations in the final pattern in this manner, for if the release paper is applied to the unset viscous material with somewhat greater pressure different color areas may be caused to run together giving beautiful halftone effects such as marble. The resultant surfaces are in consequence not only patterned in color but will have the required surface finish. For example a marble type design will have a high gloss finish, and a simulated leather design will have a leather grain of a specific type, or a patent leather finish.

A pattern formed according to this invention may be transferred from the surface on which it is initially formed to another surface. When transfer is contemplated, it is preferable to form the pattern initially on a non-adherent surface such as release paper, metal foil or glass cloth coated with polytetrafluoroethylene ("Teflon"). The receiving surface, which can be coated in a contrasting color, uncoated, or wet with a liquid compatible with the viscous material on the release surface, is then brought into proximity with the surface on which the pattern was initially formed, under slight pressure which is preferably insufficient to cause undue mutilation or crushing of the pattern. The non-adherent initial surface may then be stripped off or left in place until after setting of the viscous material. In the former case several transfers can be made onto the same surface in the manner of overprints to produce three dimensional effects. In the latter case the non-adherent material will impart its texture to the finished film or coating.

Transfer of the pattern from a non-adherent surface can also be operated after its setting. For this procedure a pattern is formed in the usual way on either a rigid surface such as a sheet metal treated with a release agent, or on a flexible surface such as a release paper or other release surface which may also serve to impart surface texture to the finished product. The viscous material is then set or fused. Another surface either flexible or rigid, having a coating of viscous material in contrasting color thereon which will serve as a background color to the pattern, is then brought into pressure contact with the first surface having the set viscous material thereon. The two surfaces remain in contact during fusing or setting when the release surface is stripped from the solidified coating. In this way decorative patterns with clear definition can be produced in a coating, which will at the same time be given the required surface finish.

Free films of viscous plastic materials can also be formed in this manner in that the coated receiving surface can comprise a second non-adherent material, both being left in contact until after setting or fusing. The initial pattern may be set or unset for this application.

When free films of plastic materials are formed according to this invention it is necessary to use a viscous material which when set will have the required properties such as structural strength, flexibility, and so on. Vinyl dispersions will produce excellent unsupported films.

As already mentioned, to produce these films release surfaces are used to which the viscous material does not adhere when set. Metal foil and sheet, glass cloth and paper, coated or treated with release agents such as "Teflon" are examples of such materials, which can also bear a specific surface finish or texture which they will impart to the film.

The viscous material is sandwiched between two opposed release surfaces. Pressure is applied and the surface separated from each other in the usual manner.

Upon setting or fusing, the set plastic material is stripped from the non-adherent backing surface, leaving a free film decorated in depth and in which the decorative pattern will be an integral part of the film, being of the same basic material so that it cannot be removed by abrasion and wear. This is in contrast to films printed on their surface by conventional methods.

In all cases where an adherent coating is formed according to this invention, it is necessary to choose as the viscous material one which will give a coating having a flexibility at least as great as that of the backing surface to which it is applied. This is necessary in order to prevent cracking of the decorative film upon flexure of the backing surface.

It is possible to etch metal and plastic plates, sheets, and foil according to this invention. For example, a decorative pattern may be formed in the usual way using two flat metal plates. A viscous material which can serve as a protective agent is used, and the back of the plates are also protected with this material. The veined pattern will be produced in relief and only a thin coating of the viscous material is left in certain areas of the pattern, which is now allowed to set. The plates are plunged into a bath of an etching fluid such as an aqueous sodium hydroxide or an aqueous acid which does not attack the coating material. The areas substantially void of coating will be etched in intaglio. Alternatively, the metal plates may be treated electrolytically to form the pattern either in relief or intaglio.

If better pattern contrast is required, it is possible to remove the thin areas of the coating by brushing them of with a soft cloth or by use of a solvent.

Plastic sheets can also be etched in a similar manner with the appropriate solvents.

This invention may be carried out continuously by using a pair of flexible webs as opposed surfaces on which the coating is formed. Pressure may be applied by passing the two webs between a pair of rolls. The webs are separated after passing through the rolls, thus forming a pattern as previously described.

The invention will now be described in more detail with reference to the accompanying drawings, in which:

FIGURES 1a, 1b, and 1c illustrate diagrammatically the basic sequence of steps in the process;

FIGURE 2 illustrates a form of apparatus for applying a pattern by means of ink or paint using a single endless belt to support two webs;

FIGURE 3 illustrates a similar form of apparatus but without the endless belt;

FIGURE 4 shows a form of apparatus for decorating a rigid sheet;

FIGURE 5 shows a modification of the apparatus of FIGURE 4;

Figure 6:
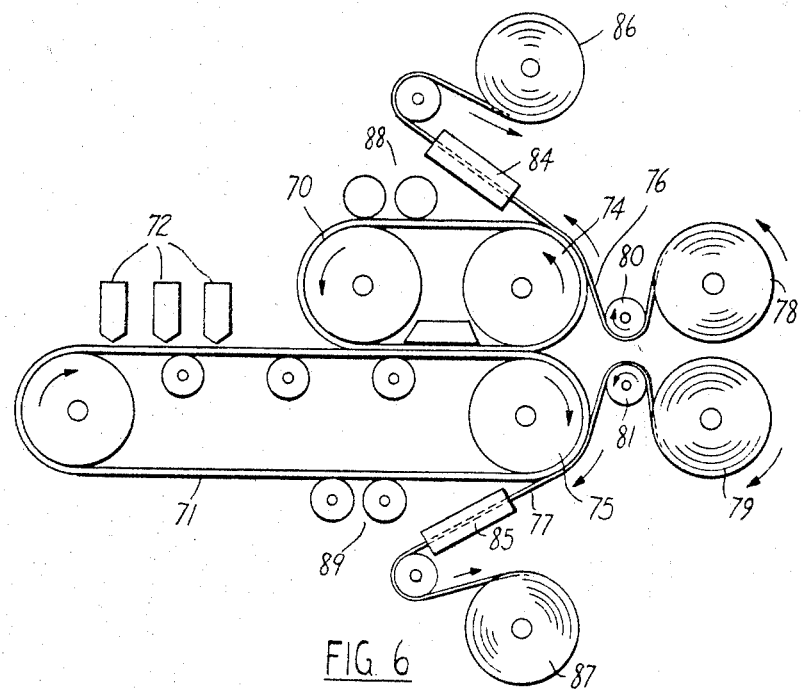
FIGURE 6 shows a form of apparatus using two endless belts for transfer purposes.

Referring first to FIGURES 1a, 1b and 1c, FIGURE 1a shows a sheet of material 1 which may be either rigid or flexible. This has applied to its surface a layer of viscous material 2 which may be either an ink or a paint or may have the property of providing a protective coating on the sheet. Yet again the viscous material 2 may be formed by softening the surface of the sheet 1 by means of a solvent. On top of this is placed a second sheet of material 3 which is then pressed firmly in position as shown in FIGURE 1b. Finally, the sheet 3 is separated from the sheet 1 starting at one edge as shown in FIGURE 1c and is moved in the direction of the arrow 4. The effect of this separation is to produce a pattern on the facing surfaces of the two sheets.

Turning to FIGURE 2 a web of synthetic resin 6 is drawn from a roll 7 and passes beneath devices 8 for applying an even coating of paint or ink, such as those already described or a viscous solution for producing relief effects to the upper surface of the web. During the application of the paint or ink the web is supported by a driven endless belt 9 against which it is held by a roller 10. The web then passes into contact with a second web 11 drawn from a roll 12 and guided by a series of rollers each shown as 13. A roller 14 presses the two webs together and they then pass together beneath a device for applying a controlled pressure indicated generally at 15. After emerging from under a further roller 16, the webs separate so as to produce a pattern as previously described. They pass together through a drying device 17 and are then reeled up on rolls 18. In some cases it may be necessary to augment the drier 17 in which case additional drying may be provided at 18, the webs being reeled up on rolls 19. The rolls 10 and 13 can be driven so as to increase the electrostatic charge on the webs by frictional contact if required.

The apparatus of FIGURE 3 is similar to that of FIGURE 2 except that no endless belt is used. The two webs shown as 20 and 21 are drawn through the apparatus by a pair of nipping rolls 22 being held back by gripping rollers 23, the upper of which can be used to increase the electrostatic charge on the web by friction if required. In addition, the web 20 is tensioned by a roller 24 and the web 21 is tensioned by roller 25 and has a roller 26 for increasing its electrostatic charge if necessary. During their passage between the rollers 23 and 22, the webs are held under sufficient tension as not to require support by an endless belt although supporting rollers 27 are provided. Paint or ink is applied by devices 30 and the tensioned webs pass together between pressure-applying devices 35. After passing between the rollers 22, they separate to form a pattern and after passing through a drier 36 are reeled up on reels 37.

FIGURES 4 and 5 show a form of apparatus suitable for use with material in the form of a rigid sheet. The rigid sheet is shown as 40 and is supported by rollers 41 and 42 and also an endless belt 43, being pressed against the latter by a further endless belt 44. The belt 44 is driven by a roller 45 and passes around further rollers 46 and 47. Paint, ink or viscous material is held in a hopper 48, the bottom of which is defined by the belt 44 and one side of which is defined by a further roller 49 which presses the belt 44 against the roller 45. As a consequence a thin film of paint, ink or viscous material is applied to the belt 44 and passes into contact with the sheet 40 against which it is pressed over the length of its path during which the two surfaces are in contact. When the belt 44 passes around the roller 46 the two surfaces are separated to form a pattern in colour or relief on both the sheet and the belt. The pattern is allowed to dry in the usual way on the sheet 40 but is removed from the belt 44 by a cleaning knife 50, the material thus removed from the belt falling into a receptacle 51.

In the modification of FIGURE 5, which is also intended for decorating a rigid sheet, the sheet is shown as 55 and is supported by rollers 56. Paint, ink or viscous material is applied to the sheet 55 by means of a hopper arrangement 57. The sheet then passes between a lower endless belt 58 and an upper endless belt 59 which passes around a triangular path defined by rollers 60, 61 and 62. The paint, ink or viscous material on the sheet 55 is pressed between the sheet and the belt 59 and as the belt passes around the roller 62, the two surfaces part company to form a decorative pattern in color or relief. That on the sheet 55 is allowed to dry in the usual way and that on the belt 59 is removed by a scraper knife 63, the material removed falling into a receptable 64.

FIGURE 6 illustrates a form of apparatus for the application of patterns to materials such as textile fabrics on which the patterns to materials cannot be produced directly but must be transferred. For this purpose the pattern is initially formed on two endless belts 70 and 71. Paint or ink is applied to the lower belt 71 by devices 72 and the two belts are pressed together over their common path by a device 73. At the end of this path they separate and pass around rollers 74 and 75. The pattern is formed in the usual way at the point of separation and is then subsequently transferred to webs 76 and 77 which engage the endless belts over part of their arcs of contact with the rollers 74 and 75. The webs 76 and 77 which may be, for example, of textile fabric or paper are drawn from reels 78 and 79 and after passing around guide rollers 80 and 81 move into contact with the endless belts 70 and 71 as already described. During this period of contact the pattern is transferred from the endless belts to the webs which next pass through driers 84 and 85 to be wound up on rolls 86 and 87. Any residual pattern on the endless belts is then removed by cleaning devices 88 and 89 so that the surfaces of the belts are ready for the production of a further pattern. Instead of obtaining a transfer from endless belts as illustrated in FIGURE 6, the transfer may be obtained from webs of material as shown in FIGURES 2 and 3. In FIGURE 3, for example, it is necessary to modify the arrangement by increasing the arcs of contact of the webs with the rollers 22 so that they pass around approximately half the circumference of these rollers. Webs on to which the pattern is transferred may then be led into contact with the pattern on the webs 20 and 21 in much the same way as shown in FIGURE 6.

Figure 7:
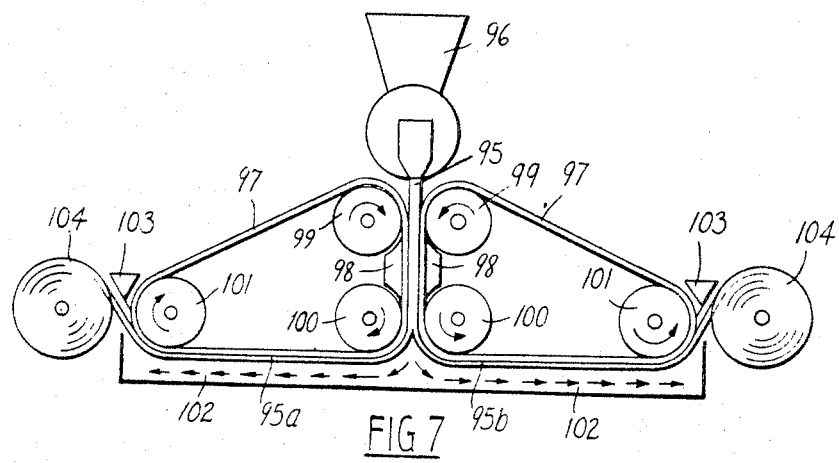
FIGURE 7 shows a form of apparatus for the production of color and relief effects throughout a layer of resin extrudite emerging from a die.
Figure 8:
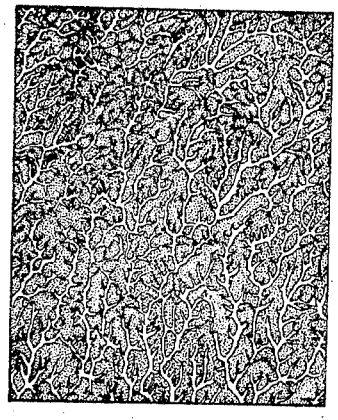
FIGURES 8, 9 and 10 show typical patterns produced by a process in accordance with the invention.
Figure 9:
Figure 10:

The apparatus of FIGURE 7 is designed for the production of decorative patterns both in color and relief throughout a layer of plastic 95 as it emerges from a die shown diagrammatically as 96. The web 95 passes between a pair of endless belts 97 which are pressed together by pressure devices 98. The belts are driven around a substantially triangular path defined by rollers 99, 100 and 101 and when the web 95 reaches the rollers 100, the conditions are such that the web adheres to the belts 97 and is split along its thickness into two separate films 95a and 95b. These films next pass through drying apparatus shown diagrammatically at 102 and by the time they reach rollers 101 they are in a condition to part from the endless belts, this effect being assisted by doctor knives 103. The films are then wound up on rollers 104. Provided that pigment is included in the mixture from which the plastic web is to be formed, a pattern in both color and relief is produced as the two halves of the web split apart on leaving the rollers 100. Owing to the plastic nature of the material and the relative thinness of the films, the production of a pattern in relief on one surface induces a reverse pattern on the opposite surface to give a gauffered effect. If a pattern in only color is required, the relief effects can be subsequently removed by pressing the films and if only a relief effect is required, no pigment need be included in the original mix.

One very important method of modifying the pattern produced consists in changing the speed of separation of the surfaces, e.g. by making the separation intermittent, or by causing the surfaces to travel at different speeds past the point or line of separation. A sheet of cellulose acetate was first spread evenly with a colored polymer emulsion to provide a background color and differently colored emulsions were then sprayed on in patches. A second cellulose acetate sheet was then rolled on so as to eliminate all air bubbles. After lightly pressing the two sheets together, they were then separated from one end using an intermittent motion for separating the first half of the length, a steadily increasing speed of separation for the next quarter of the length and for the final quarter a rapid pull. The patterns were the same on the two sheets and the photograph is of one of them. The intermittent separation produced a watered and ribbed effect, the steadily increasing speed of separation gives a steady opening out of the pattern and finally the high speed of separation in the last quarter gives a finely veined pattern. Differential speeds of the two surfaces relative to one another is of particular value where the two surfaces before being pressed together carry differently colored viscous materials applied either uniformly or locally, where one of the surfaces carried differently colored viscous materials in two or more layers or where one or both of the surfaces carried a single viscous material containing two or more colors heterogeneously dispersed therein. The effect of the differential speed of the surfaces is to produce a partial blending or a smearing of the colors.

The invention will now be descrived in greater detail with reference to the following examples:

Example 1

Two sheets of polymethyl methacrylate measuring 14 x 19 cm. and having a thickness of 1.5 mm. are used. The sheets as received directly from the manufacturers have their surfaces protected by paper. The protective paper is removed from one surface, which is cleaned with methylated spirit. A thin layer of ink is then brushed onto the surface of one sheet. The ink is an aqueous emulsion of an acrylic polymer sold under the name "Liquitex" polymer emulsion by Permanent Pigments, Inc., Cincinnati, Ohio, U.S.A. The ink has a viscosity of 2 minutes using a Ford Cup No. 4 at a temperature of 20° C. After the application of a layer of ink on one surface, the clean surface of the other sheet is brought into contact with it. Pressure of the order of 27 kg. is applied to the two and care is taken to eliminate all air bubbles. The two surfaces are then separated beginning at one end and progressing at a regular speed to the other end so that the sheets are separated in between 2 and 3 seconds.

Example 2

Two flexible sheets of polymethyl methacrylate, an aqueous acrylic polymer emulsion (approximately 50% solids) and a solution of 1 part of copper sulfate in 15 parts of water are used in carrying out this example. The copper sulfate solution is mixed into the acrylic polymer emulsion which serves as a carrier or vehicle. The proportion is approximately 50% of acrylic polymer emulsion and 50% of copper sulfate solution.

A thin film of this mixture is placed on one sheet of the polymethyl methacrylate, and the other sheet is slid over the first sheet to further thin the mixture to obtain a continuous even film. The sheets are then separated from one edge and left to dry. Copper sulfate crystals will form within the coat, and their specific orientation makes a beautiful decorative coat upon the plastic sheets.

Example 3

Materials used:

2 pieces of woven cotton textile material bearing either a primer or a preliminary fused coat of a plastisol Polyvinyl chloride plastisol in two colors
Urethane foam covered rollers, one of large dimension and one of small dimension, which is preferably mounted as the upper roller.

One piece of cloth is coated in one color, the other in a contrasting or harmonizing color.

The two coated surfaces are placed in contact and fed to the nip of the two revolving rollers geared so that the upper roller has a peripheral speed higher than that of the lower roller. The feed rates of the two coated fabrics are equal to the peripheral speeds of the respective rollers. As they reach the opposite side they are separated, and the upper fabric, traveling more rapidly than the lower, has a smearing action upon the two-toned or colored plastisols while on separation of the two surfaces patterning will result.

One of the two samples is now fused in an oven at 350° F. for 3 minutes, the second sample has a piece of release paper with a high gloss finish rolled out over it and is fused in an oven at the same temperature for 20 minutes, after which the release paper is removed. The first sample bears some relief while the second one is perfectly smooth and has the appearance of marble.

Example 4

Two pieces of felt base floor covering 30 x 30 cm. having a preliminary fused coating on them are given a coating of plastisol (a dispersion of vinyl resin in plasticizer) of medium viscosity (10,000 to 50,000 cps.), one in one color and the other in a contrasting color. They are then placed in contact and pressure of about 0.7 to 0.9 kg./cm.$^2$ is applied to exclude all air bubbles and assure uniform contact of the contrasting layers of plastisol. The two samples are then separated at a speed of 15 cm./sec.

One sample is now placed in an oven at about 370° F. for 5 minutes to obtain fusion of the plastisol. The finished sample will bear both a color effect and an effect in relief.

The other sample is treated differently in that a smooth sheet of release paper with a high gloss finish is unrolled gently onto the viscous surface, flattening the relief effect and blending the colors to some extent. This sample is also placed in the oven for fusion, which will last approximately 10 to 20 minutes at 350° F. It is then removed from the oven and allowed to cool, when the paper is removed from the face of the sample. The resulting sample has a glossy finish and attractive grained or marbled color effects.

Example 5

Example 4 is repeated but one of the samples is given a coating of high viscosity plastisol (approximately 50,000 cps.) in one color, followed by a second coating of lower viscosity plastisol (approximately 30,000 cps.) in another color. Before fusing, the patterned surfaces have released papers rolled onto them. The degree of pressure applied to the release papers as they are rolled on will determine the degree of blending which will occur in the colors of the viscous materials. Many multicolored and toned effects can be obtained in the depth of the coating in this manner. Such effects could not be obtained by conventional processes.

Example 6

Materials used:

2 metal plates
1 sample of nylon woven fabric
An aqueous emulsion of acrylic polymer pigmented with phthalocyanine blue (viscosity 1 min. Ford Cup No. 4 at 20° C.)
2 to 5% fine bronze particles.

The bronze particles are homogeneously mixed into the acrylic polymer emulsion. The textile sample is soaked in the emulsion and then taped to one of the metal plates. The second metal plate is placed over it and pressure of about 0.6–6.8 kg./cm.$^2$ is applied. The two are then separated at a speed of about 10 cm./sec., causing formation of several tone effects on the textile sample, which is subsequently stripped from the second metal plate and dried. Following drying, further heating of the emulsion is carried out for three minutes in a hot air system at 150–190° F.

Example 7

Materials used:

2 flexible highly polished metal plates treated with a release agent
Vinyl plastisol of medium viscosity (approximately 30,000 cps.) and approximately 10% pigment content
Vinyl plastisol of high viscosity (approximately 50,000 cps.) and 20 to 50% pigment content
Sample of thick felt suitable for a floor covering base, 18 x 18 cms.
Sample cotton fabric suitable for a leathercloth base, 18 x 18 cms.

One of the metal plates is coated with a plastisol of low pigment content and the other is placed into contact with about 2 lbs./cm.$^2$ pressure applied. They are then separated from one edge, at an approximate speed of 10 cm./sec. causing an identical veined design to form on both. The colored part of the design will be in both color and relief, while the plastisol in between the colored veins will be practically transparent. One of the plates is now placed in the oven for 1 min. at 375° F. which fuses the plastisol. On removal the decorated plate is placed into contact with the side of a sample of felt-base floor covering carying a viscous layer of about 3 mm. contrasting color plastisol. Pressure in the order of 2 to 6 lbs. is applied. The assembly is now placed in the oven and fused for 15 mins. at 350° F. On removal from the oven the metal plate is stripped from the surface of the sample. The felt will now carry a tough wear-resistant coating with a high gloss finish and a veined design of one color on a contrasting color background.

The sample of cotton fabric is coated with 1 mm. high viscosity plastisol which will not enter the bulk of the material. It is then unrolled upon the second plate carrying the decorated coating of viscous plastisol. Gentle pressure is applied by means of a roller, and this blends the veined design with the contrasting color background. The assembly is then placed in the oven and fused for 5 minutes at 375° F.

Example 8

The design is created on two metal plates as in Example 7 above, but the pattern on one plate is transferred to a piece of release paper (Qual. 5588, Emb, Bison 40) by bringing the paper into contact with the coating on the metal plate under slight pressure, and immediately separating it again. A cotton fabric, suitable for a leathercloth backing, is coated with high viscosity plastisol which does not penetrate into its bulk, and the patterned release paper is rolled onto it with sufficient pressure to exclude air bubbles. The assembly is now placed in an oven for 5 mins. at 375° F. fusing the plastisol to a solid film which adheres to the cotton fabric, and from which the release paper is stripped, leaving a decorative coating in two colors with a beautiful leather grain finish.

A release paper with a matte finish, coated in a contrasting color plastisol of between 30 and 50,000 cps. is rolled onto the design carried by the other metal plate. The two are now placed in an oven and fused for 5 mins. at 375° F. On removal from the oven the solidified film of plastisol is removed both from the metal plate and from the release paper. The resultant free film has a veined design of one color on a contrasting color background, as an integral part of the film.

Example 9

Material used:

2 aluminum plates, 18 x 18 cms. (protectively coated on on side)
Aqueous based vinyl emulsion
Bath of aqueous sodium hydroxide (percent by wt. NaOH)

A thin coating of a vinyl emulsion is given to the uncoated side of one aluminum plate and the uncoated side of the other plate is slid over it and pressure of the order of 36 kg. applied to the two. They are then separated from one edge, leaving an identical veined pattern on both plates. These plates are then placed in a bath of sodium hydroxide for 5 to 15 mins., removed and rinsed. The patterned emulsion film is then removed from the plates with a solvent such as toluene. It will be found that the most pronounced veined areas in the emulsion will have remained unengraved, while the areas between them have been etched away leaving two very finely engraved and decorated aluminum plates. If better definition of the design is required, the plates are run under a slow running water tap for a few seconds before etching to remove the emulsion from the areas between the veins in relief and permit more rapid etching to occur.

Example 10

Materials used:

2 flexible sheets of aluminum
2 samples of nylon
Acrylic polymer emulsion paint in several colors (viscosity 2 mins. Ford Cup 4 at 20° C.)

The acrylic polymer emulsion is brushed onto one of the sheets of amuminum and the other sheet rolled onto it with pressure of about ½ lb./cm.² The plates are then separated from one edge forming a veined design in the polymer emulsion. The nylon fabric is then spread over the viscous design on one plate and quickly removed. This will transfer part of the design to the fabric but will leave sufficient viscous material on the sheet for a further transfer. The second web of fabric is then wet with water and spread upon the same sheet. In a few seconds the rest of the design is absorbed by the fabric, which can be removed and the sample dried. It will be decorated with a beautifully graduated and watered design. The design on the other metal sheet can be air-dried or can be oven-dried at a temperature of approximately 175° F. The acrylic polymer emulsion paint not only serves as a protective coating to the metal but the almost transparent areas of the coating allow the metal to shine through it in a very effective manner.

What is claimed is:

1. A method for forming a viscosity dependent decorative pattern on a surface which comprises:
   (a) bringing together a pair of members having at least one layer of a viscous material between the opposed surfaces thereof, wherein:
      (1) at least one of said members is a flexible sheet,
      (2) said viscous material is:
         (i) substantially non-leveling in its unset condition and capable of subsequent setting and substantially non-penetrating into said members, and
         (ii) comprises a polymer derived from ethylenically unsaturated compounds in a liquid phase which material is inert with respect to said members,
   (b) applying pressure to said members,
   (c) progressively peeling said members before said viscous material begins to set, the separation of said members causing said viscous material to be partitioned between said members and to be drawn into a pattern which is reproduced on the surfaces of each of said members as said members are separated;
   (d) controlling said pattern by controlling the viscosity of said polymer and the speed of separation; and
   (e) setting said polymer to yield a viscosity dependent decorative pattern.

2. A method according to claim 1 in which said polymer is a vinyl polymer dispersed in said liquid phase.

3. A method according to claim 1 in which said polymer is dispersed in an organic liquid phase.

4. A method according to claim 1 in which said polymer is selected from the group consisting of an acrylic polymer and vinyl chloride, dispersed in said liquid phase.

5. A method according to claim 4 including the step of applying pressure to at least one of said patterns sufficient to flatten said pattern.

6. A method according to claim 1 in which said members have at least two layers of said viscous material between the opposed surfaces thereof, said layers being of contrasting colors, whereby two-color patterns are produced on the surfaces of said members.

7. A method according to claim 1 in which said viscous material comprises solid particles of said polymer dispersed in said liquid phase.

8. A method according to claim 7 including the step of transferring at least one of said patterns to another sheet before said pattern is set, thereby forming said pattern on said another sheet.

9. A method according to claim 7 in which said polymer is dispersed in an aqueous liquid phase.

10. A method according to claim 7 in which both of said members are flexible sheets and wherein said process is operated continuously.

11. A method according to claim 7 wherein said members are selected from the group consisting of metals, plastics, textile material and paper.

12. A method according to claim 7 wherein:
   (1) at least one of said members having said pattern thereon in unset condition is contacted on said pattern with a release coated member;
   (2) said viscous material is set; and
   (3) said release coated member is stripped from said pattern.

13. A method according to claim 7 wherein at least one of said members has a release coating thereon which is in contact with said viscous material, and
   (1) contacting said unset viscous material on said release coated member with another release coated member after said separation;
   (2) setting said viscous material, and
   (3) stripping said members from said set viscous material.

References Cited

UNITED STATES PATENTS

| | | | |
|---|---|---|---|
| 409,834 | 8/1889 | Endres | 156—234 |
| 1,882,714 | 10/1932 | Anier et al. | 156—234 |
| 2,027,744 | 1/1936 | Miller | 161—2 |
| 2,768,902 | 10/1956 | Scholl | 156—247 |
| 1,572,348 | 2/1926 | Carow. | |

FOREIGN PATENTS 882,357  7/1953  Germany.

JACOB H. STEINBERG, *Primary Examiner.*

U.S. Cl. X.R.

117—37; 156—230, 234, 237, 240, 247; 161—406, 413; 264—73, 213

UNITED STATES PATENT OFFICE
CERTIFICATE OF CORRECTION

Patent No. 3,434,861      Dated March 25, 1969

Inventor(s)   JANE LUC

It is certified that error appears in the above-identified patent and that said Letters Patent are hereby corrected as shown below:

In the Specification

Column 2, line 32 delete "iis" and insert therefor --is--; Column 2, line 63 delete "aplication" and insert therefor --application--. Column 3, line 55 delete "rontinuous" and insert therefor --continuous--; Column 3, line 62 delete "decoraitve" and insert therefor --decorative--. Column 4, line 13 delete capital "A" and insert therefor --As--. Column 6, line 15 after "as" insert --a--. Column 7, line 4 delete "flexture" and insert therefor --flexure--; Column 7, line 23 delete "of" and insert therefor --off--. Column 9, line 55 delete "sheeet" and insert therefor --sheet--. Column 10, line 3 delete "descrived" and insert therefor --described--. Column 11, line 25 delete "released" and insert therefor --release--; Column 11, line 45 delete 6.8 and insert therefor --0.8--. Column 12, line 46 delete "on" and insert therefor --one--. Column 13, line 2 delete "amuminum" and insert therefor --aluminum--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents